(12) United States Patent
Naik et al.

(10) Patent No.: US 9,458,746 B2
(45) Date of Patent: Oct. 4, 2016

(54) SYSTEMS AND TECHNIQUES FOR HEATING UREA INJECTION SYSTEMS

(71) Applicant: Cummins Emission Solutions, Inc., Columbus, IN (US)

(72) Inventors: Mugdha Naik, Columbus, IN (US); Yongquan Chai, Columbus, IN (US); Shu Zhang, Columbus, IN (US); Xin Jin, Columbus, IN (US); Srivardhan Chandrapati, Columbus, IN (US); James Houghtell, Columbus, IN (US); Deepu J. Chandy, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 365 days.

(21) Appl. No.: 13/782,017

(22) Filed: Mar. 1, 2013

(65) Prior Publication Data

US 2014/0245722 A1    Sep. 4, 2014

(51) Int. Cl.
| | |
|---|---|
| *F01N 3/00* | (2006.01) |
| *F01N 3/10* | (2006.01) |
| *F01N 3/20* | (2006.01) |

(52) U.S. Cl.
CPC .......... *F01N 3/2006* (2013.01); *F01N 3/2066* (2013.01); *F01N 2610/105* (2013.01); *F01N 2900/1811* (2013.01); *F01P 2060/00* (2013.01); *Y02T 10/24* (2013.01)

(58) Field of Classification Search
CPC .......... F01N 2610/10; F01N 2610/11; F01N 2610/105; F28F 27/02
See application file for complete search history.

(56) References Cited

U.S. PATENT DOCUMENTS

| | | |
|---|---|---|
| 8,122,710 B2 | 2/2012 | Schmale et al. |
| 2009/0205320 A1 | 8/2009 | Mokire et al. |
| 2011/0243818 A1 | 10/2011 | Frederiksen |
| 2012/0020857 A1 | 1/2012 | Isada et al. |

FOREIGN PATENT DOCUMENTS

DE          102004061259     *  7/2006   ............... F01N 3/08

OTHER PUBLICATIONS

Machine English translation of DE 10 2004 061 259.*
Bosch Diesel Systems, Denoxtronic 2.2—Urea Dosing System for SCR Systems, Brochure, 2 pages, Copyright Robert Bosch GmbH 2010, Printed in Germany.

* cited by examiner

*Primary Examiner* — Audrey K Bradley
*Assistant Examiner* — Jason Sheppard
(74) *Attorney, Agent, or Firm* — Foley & Lardner LLP

(57) ABSTRACT

A reductant delivery system is provided for delivery of reductant to an engine exhaust aftertreatment system that is heated during cold temperature conditions. A heat exchange fluid flows through a heat exchange circuit that provides a flow path from the heat source to the doser, from the doser to the reductant storage tank, and from the reductant storage tank to the heat source. A control valve controls the flow of the heat exchange fluid in the heat exchange circuit so that at least one heat exchange cycle includes a circulation period that increases the temperature of the reductant in the doser and storage tank and a termination period where circulation is stopped until reductant temperature in the doser reaches a lower limit.

16 Claims, 4 Drawing Sheets

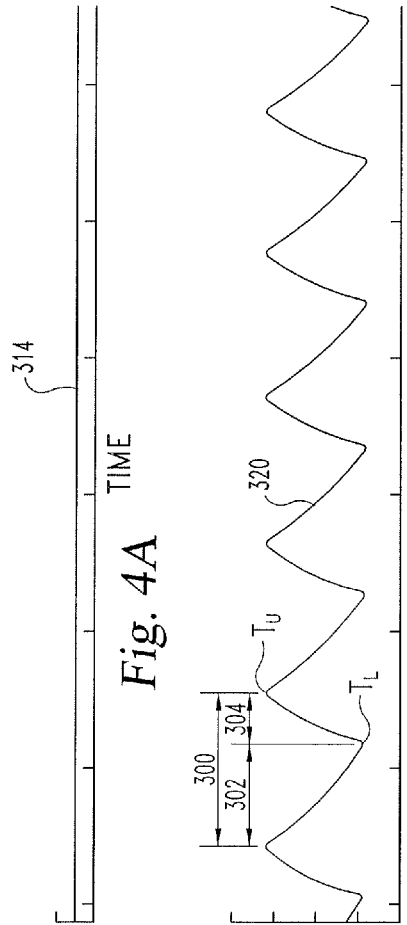

SYSTEMS AND TECHNIQUES FOR HEATING UREA INJECTION SYSTEMS

BACKGROUND

Selective catalytic reduction ("SCR") exhaust aftertreatment systems are an important technology for reducing NOx emissions from internal combustion engines such as diesel engines. SCR systems generally include a source of storage for the urea solution, a doser that includes at least one of a pump unit for pressurizing the urea solution and a metering unit for providing a controlled amount or rate of urea solution to an SCR catalyst, and an injector which provides urea solution to a urea decomposition region of an exhaust flow path located upstream from an SCR catalyst. Many SCR systems also utilize pressurized gas to assist the flow of urea solution to the injector. While providing important reductions in NOx emissions, SCR systems suffer from a number of shortcomings and problems. For example, the storage tank and doser are typically mounted to the chassis of the vehicle, and are exposed to ambient temperature. In cold weather conditions, the urea solution can freeze or be too cold to function effectively in the storage tank and/or doser. While various approaches have been implemented to heat the urea solution, such approaches are typically complex and expensive, and/or involve the independent supply of heat to each of the portions of the SCR system through the use of multiple flow paths and valves in the heating distribution system and/or the use of electric heaters. Thus, there is a need for advancements mitigating these and other shortcomings associated with heating delivery systems for a reductant such as a urea solution.

SUMMARY

Certain exemplary embodiments include systems and techniques for thermal management of at least a storage tank and a doser of a reductant delivery system for an SCR catalyst. In one embodiment, the system includes a heat exchange circuit connected to a heat source, and the heat exchange circuit defines a flow path that is routed from the heat source to the doser, from the doser to the storage tank, from the storage tank to the doser, and from the doser to the heat source. A control valve is provided in the flow path to regulate a flow of heat exchange fluid in the flow path. In one particular embodiment, the control valve is located in the flow path after the storage tank.

In another embodiment, the system includes a heat exchange circuit connected to a heat source and the heat exchange circuit provides a flow path for a heat exchange fluid. The flow path is routed from the heat source to a doser and then to a storage tank to provide thermal contact of the heat exchange fluid with the reductant in the doser and the storage tank. The system further includes a control valve in the heat exchange circuit and a controller operably connected to the control valve. The controller is configured to modulate the control valve between a first position allowing flow of the heat exchange fluid in the flow path and a second position preventing flow of the heat exchange fluid in the flow path.

In embodiments of the system and method, the controller controls operation of the control valve to open and close the control valve to increase the temperature of the reductant in the storage tank from one heat exchange cycle to the next heat exchange cycle while maintaining the temperature of the reductant in the doser between upper and lower temperature thresholds. In certain embodiments, the system and method include a heat exchange cycle that includes a circulation period of the heat exchange fluid that is initiated by opening the control valve to heat the reductant in the doser to an upper temperature limit while increasing the temperature of the reductant in the storage tank, and a termination period that is initiated by closing the control valve to end the first circulation period to allow the reductant in the doser to cool at a first rate to a lower temperature limit while the reductant in the storage tank cools at a second rate that is slower than the first rate. When the reductant in the doser reaches the lower temperature limit indicating the end of the termination period and the first heat exchange cycle, a second heat exchange cycle can be initiated with a second circulation period started by opening the control valve to heat the reductant in the doser and to heat the reductant in the storage tank. The heat exchange cycles are repeated until the reductant in the storage tank reaches a predetermined temperature threshold. Further aspects, embodiments, forms, features, benefits, objects, and advantages shall become apparent from the detailed description and figures provided herewith.

BRIEF DESCRIPTION OF THE DRAWINGS

FIGS. 4A-4D are diagrams showing an exemplary operation of the reductant heating procedure to heat the reductant delivery system over a time period.

DETAILED DESCRIPTION OF EXEMPLARY EMBODIMENTS

Figure 1:
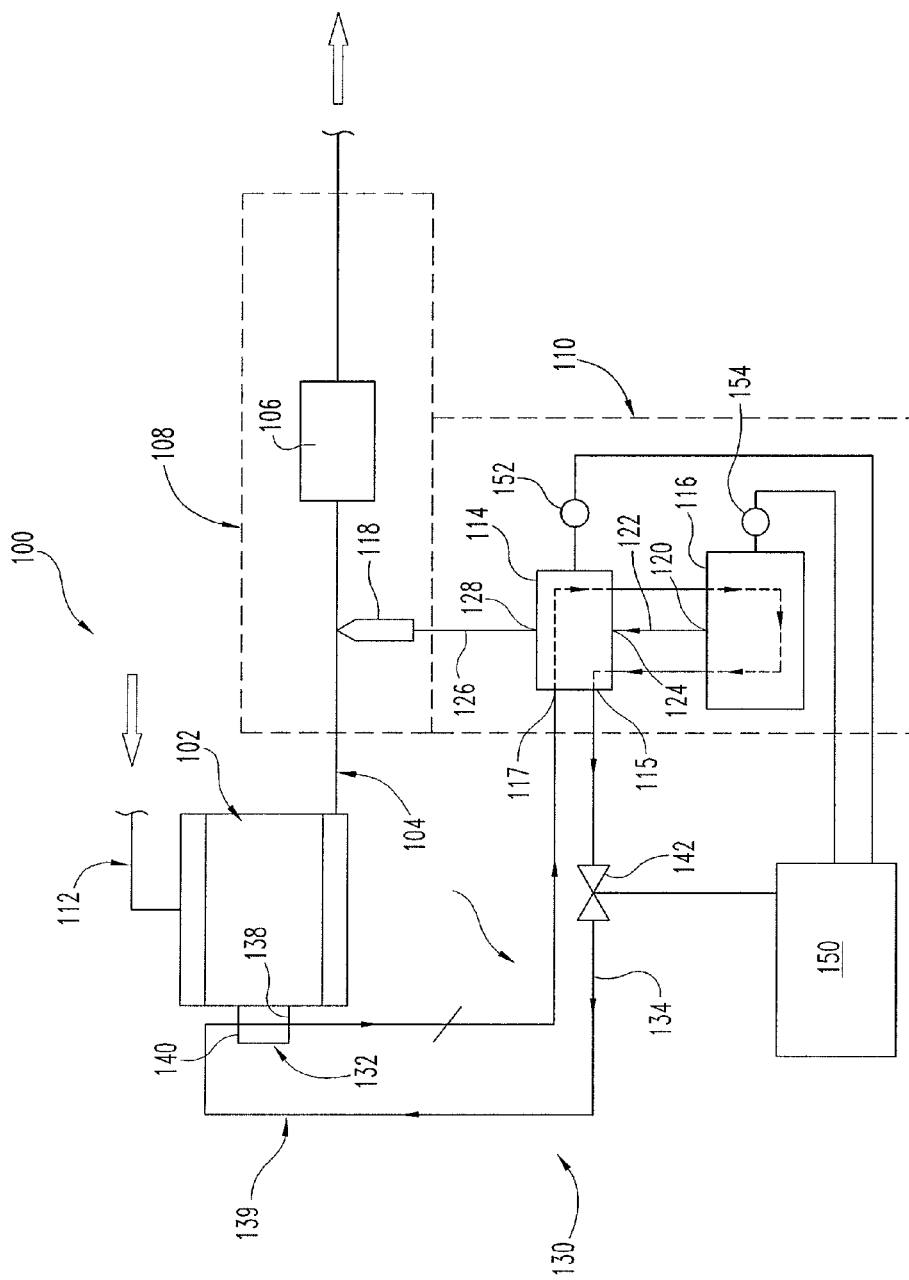
FIG. 1 is a schematic view of an exemplary reductant delivery and heating system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1 there is illustrated an exemplary system 100 for heating of a reductant that is delivered to an exhaust system 104 of an engine 102 from a reductant delivery system 110. System 100 may be provided on a vehicle powered by engine 102 such as a diesel engine, or on an engine 102 utilized in other applications such power generation or pumping systems. Engine 102 includes an intake system 112 through which charge air enters and an exhaust system 104 through which exhaust gas resulting from combustion exits, it being understood that not all details of these systems that are typically present are shown. Engine 102 includes a number of cylinders forming combustion chambers into which fuel is injected by fuel injectors to combust with the charge air that has entered through intake system 112. The energy released by combustion powers the engine via pistons connected to a crankshaft. When used to propel a vehicle, engine 102 is coupled through a drivetrain to drive wheels that propel the vehicle. Intake valves control the admission of charge air into the cylinders, and exhaust valves control the outflow of exhaust gas through exhaust system 104 and ultimately to atmosphere. Before entering the atmosphere however, the exhaust gas is treated by one or more aftertreatment devices in an aftertreatment system 108.

In one example, the exhaust system 104 includes an aftertreatment system 108 having one or more SCR catalysts 106 and one or more locations for receiving a reductant from reductant delivery system 110. The aftertreatment system 108 may include one or more other aftertreatment components not shown, such as one or more oxidation catalysts, one or more particulate filters, an ammonia oxidation catalyst, and various temperature, pressure and exhaust gas constituent sensors. Exhaust system 104 may also include various components not shown, such an EGR system, a turbocharger system, coolers, and other components connecting exhaust system 104 to intake system 112. A reductant injector 118 is mounted on a portion of exhaust system 104 upstream of SCR catalyst 106 with its outlet, or nozzle, arranged to spray aqueous reductant into the exhaust system where it mixes with engine exhaust gas produced by engine 102. SCR catalyst 106 promotes a chemical reaction between the reductant and NOx in the exhaust gas that converts substantial amounts of NOx to reduce NOx emissions before the exhaust gas passes into the atmosphere.

Reductant delivery system 110 further includes a doser 114 that receives reductant from a storage tank 116 and provides the reductant to injector 118 or other structure for injection or delivery to a decomposition chamber or directly to the exhaust system 104. As used herein, injector includes any nozzle, static device, electronically controllable device, and/or mechanical actuator that provide an outlet for reductant delivery. One example of a reductant is a diesel exhaust fluid (DEF) which comprises a solution of 32.5% high purity urea and 67.5% deionized water. It shall be appreciated, however, that other reductants may also be utilized.

Doser 114 may include various structures to facilitate receipt of reductant from storage tank 116 and the delivery of the reductant to the exhaust system 104. For example, doser 114 may include a pump and a filter screen and a check valve upstream of the pump to receive reductant from the storage tank 116. In one form the pump is a diaphragm pump, though it shall be appreciated that other types of pumps may be utilized. The pump outputs pressurized reductant at a predetermined pressure which flows through a second check valve, a pulsation dampener, and a second filter to provide pressurized reductant to a metering valve. Doser 114 may further include a bypass line around the pump having a bypass valve which is operable to open and close to permit or prevent the flow of reductant through the bypass line to a location upstream of the first filter screen where it may be returned to the storage tank 116, for example, during a purging operation. Doser 114 may further include a blending chamber that receives reductant from the metering valve at a controllable rate. The blending chamber also receives a flow of pressurized air from an air supply and discharges a combined flow of pressurized air and reductant at an outlet of doser 114. The air supply may be integral to a vehicle, integral to an engine, or may be an air supply dedicated to system 100. It shall be understood that additional embodiments may utilize pressurized gases other than air, for example, combinations of one or more inert gases.

Storage tank 116 holds a supply of aqueous reductant and is vented to allow reductant to be withdrawn at a port 120. A conduit 122 extends from port 120 to an inlet port 124 of doser 114. A conduit 126 extends from an outlet port 128 of doser 114 to injector 118. When doser 114 operates, it draws reductant from storage tank 116 through conduit 122, and pumps the reductant through conduit 126 to injector 118. A backflow conduit (not shown) may be provided to return excess reductant to storage tank 116.

Engine 102 further comprises a heat exchange system 130 through which a heat exchange fluid, such as engine coolant, is circulated by a pump 132. A conduit 134 forms at least a portion of a heat exchange circuit 136 that defines a single flow path for the heated heat exchange fluid to flow though doser 114 and storage tank 116 to heat reductant therein by providing thermal contact of the heat exchange fluid with the reductant located in doser 114 and storage tank 116. Heat exchange system 130 receives heat from a heat source, such as engine 102, that heats the heat exchange fluid in or before it enters heat exchange circuit 136. Heat exchange system 130 may be part of the cooling system for engine 102 that is connected to a radiator (not shown) that receives and rejects heat generated by operation of engine 102. Other embodiments contemplate heat sources other than or in addition to engine 102, such as the exhaust system, an electric heater, or other source of heat that maintains or rapidly heats the heat exchange fluid for use in heating reductant delivery system 110. Furthermore, it is contemplated that fluids other than liquid coolant may be used as the heat exchange fluid.

The continuous flow path defined by the heat exchange circuit 136 extends from an outlet 138 of pump 132 to doser 114, through doser 114 to storage tank 116, through storage tank 116 to doser 114, and back through doser 114 to an inlet 140 of pump 132. A return portion 139 of the flow path extends from the second outlet 115 of the doser 114 to the first inlet 117 of doser 114 and includes a control valve 142 and pump 132 in the flow path. Conduit 134 may be comprised of a single continuous conduit through doser 114, 116, or of discrete segments connected to inlets and outlets of one or both of doser 114 and storage tank 116, with channels, conduits or other structures within one or both of doser 114 and storage tank 116 that provide a continuation of the flow path therethrough.

Heat exchange circuit 136 further includes two-way control valve 142 between outlet 115 of doser 114 and inlet 140 of coolant pump 132 that is operable to regulate a flow of heat exchange fluid through heat exchange circuit 136 in accordance with control signals from controller 150, discussed further below. Furthermore, in view of the configuration of the heat exchange circuit 136 and the control procedure disclosed herein, a single two-way control valve 142 and a single flow path for circulation of the heat exchange fluid is all that is required for the heat exchange fluid to heat reductant in doser 114 and tank 116.

The flow of heat exchange fluid in heat exchange circuit 136 may be controlled and monitored by controller 150 such as an engine control module (ECM) or a doser control module (DCM). It shall be appreciated that the controller or control module may be provided in a variety of forms and configurations including one or more computing devices forming a whole or part of a processing subsystem having non-transitory memory storing computer executable instructions, processing, and communication hardware. It shall be further appreciated that controller may be a single device or a distributed device, and the functions of the controller may be performed by hardware or software. The controller 150 is in communication with any devices, sensors, and/or actuators as required to perform the functions present in a given embodiment.

Controller 150 is operatively coupled with and configured to store instructions in a memory which are readable and executable by controller 150 to operate control valve 142 to complete one or more heat exchange cycles that heat reductant in doser 114 and storage tank 116. Controller 150 is also operatively coupled and may receive a signal from a temperature sensor 152 associated with doser 114 and a temperature sensor 154 associated with storage tank 116. Temperature sensors 152, 154 are operable to provide a signal indicating the temperature of the reductant in doser 114 and storage tank 116, respectively. Temperature sensors 152, 154 need not be in direct communication with doser 114 and storage tank 116, and can be located at any position within reductant delivery system 110 that provides a suitable indication of reductant temperature in doser 114 and storage tank 116.

Figure 2:
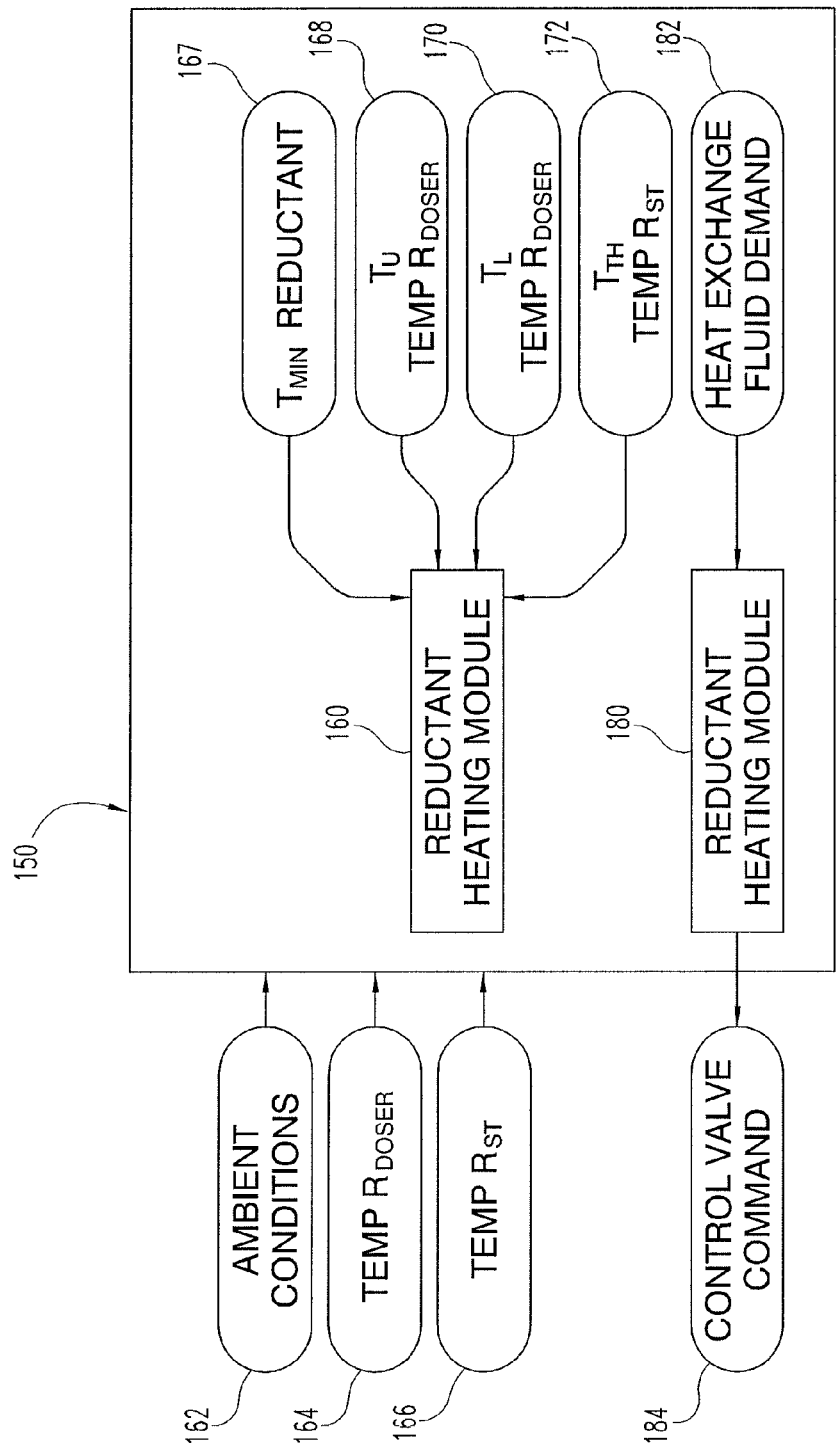
FIG. 2 is a diagrammatic view of an exemplary controller of the reductant delivery and heating system.

One embodiment of controller 150 is shown in FIG. 2. In certain embodiments, the controller 150 includes one or more modules structured to functionally execute the operations of the controller 150. In certain embodiments, the controller 150 includes a reductant heating module 160 and a control valve command module 180. The description herein including modules emphasizes the structural independence of the aspects of the controller 150, and illustrates one grouping of operations and responsibilities of the controller 150. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Controller 150 includes reductant heating module 160 that receives and interprets an ambient temperature condition input 162, the temperature of the reductant in the doser (TEMP $R_{doser}$) input 164 from sensor 152, and the temperature of the reductant in the storage tank (TEMP $R_{ST}$) input 166 from sensor 154. Furthermore, reductant heating module 160 interprets the minimum reductant temperature limit ($T_{MIN}$) 167 of the TEMP $R_{doser}$ of doser 114 and/or the TEMP $R_{ST}$ of storage tank 116. Reductant heating module 160 also interprets the upper temperature limit ($T_U$) 168 of the TEMP $R_{doser}$ of doser 114, the lower temperature limit ($T_L$) 170 of TEMP $R_{doser}$ of doser 114, and the threshold temperature ($T_{th}$) 172 of the TEMP $R_{ST}$ of the storage tank 116. Controller 150, as discussed further below, is configured to perform one or more heat exchange cycles which include a circulation period where heat exchange fluid is circulated to increase TEMP $R_{doser}$ and a termination period where heat exchange fluid circulation is stopped to allow TEMP $R_{doser}$ to cool.

$T_{MIN}$ 167 is a predetermined minimum temperature of the reductant in the doser 114 and/or storage tank 116, below which a heat exchange cycle of reductant heating is initiated by starting a circulation period of the heat exchange fluid. $T_U$ 168 of TEMP $R_{doser}$ of doser 114 is a predetermined maximum temperature of the reductant in the doser 114 at which the current circulation period of the heat exchange fluid is terminated to prevent overheating of the reductant in the doser 114, while $T_L$ 170 of TEMP $R_{doser}$ of doser 114 is a predetermined lower limit of the temperature of reductant in doser 114 at or below the termination period and current heat exchange cycle is terminated, and upon which another heat exchange cycle can be initiated with a second circulation period of heat exchange fluid to heat the reductant in doser 114 while heating the reductant in storage tank 116. $T_{MIN}$ 167 may be the same as or less than $T_L$ 170. $T_{th}$ 172 of TEMP $R_{ST}$ of storage tank 116 is the threshold temperature above which further heating of reductant in storage tank 116 is not required, terminating the heat exchange cycles until TEMP $R_{doser}$ of doser 114 and/or TEMP $R_{ST}$ of storage tank 116 reaches $T_{MIN}$ 167. Thus, depending on the reductant temperature, the heat exchange cycles can occur back-to-back with no time delay or have a time delay therebetween.

Reductant heating module 160 is configured to receive the various operational inputs 162, 164, 166 and predetermined inputs 167, 168, 170, 172 and determine whether a heating of the reductant in one or both of doser 114 and storage tank 116 is required, which generates a heat exchange fluid demand output 182. Control valve command module 180 is configured to receive the heat exchange fluid demand 182 and provide a control valve command 184 to operate control valve 142 to an on position to initiate a heat exchange cycle when circulation of heat exchange fluid in circuit 136 is demanded, or operate control valve 142 to an off position when circulation of heat exchange fluid in circuit 136 is not demanded during a termination period or between heat exchange cycles.

Figure 3:
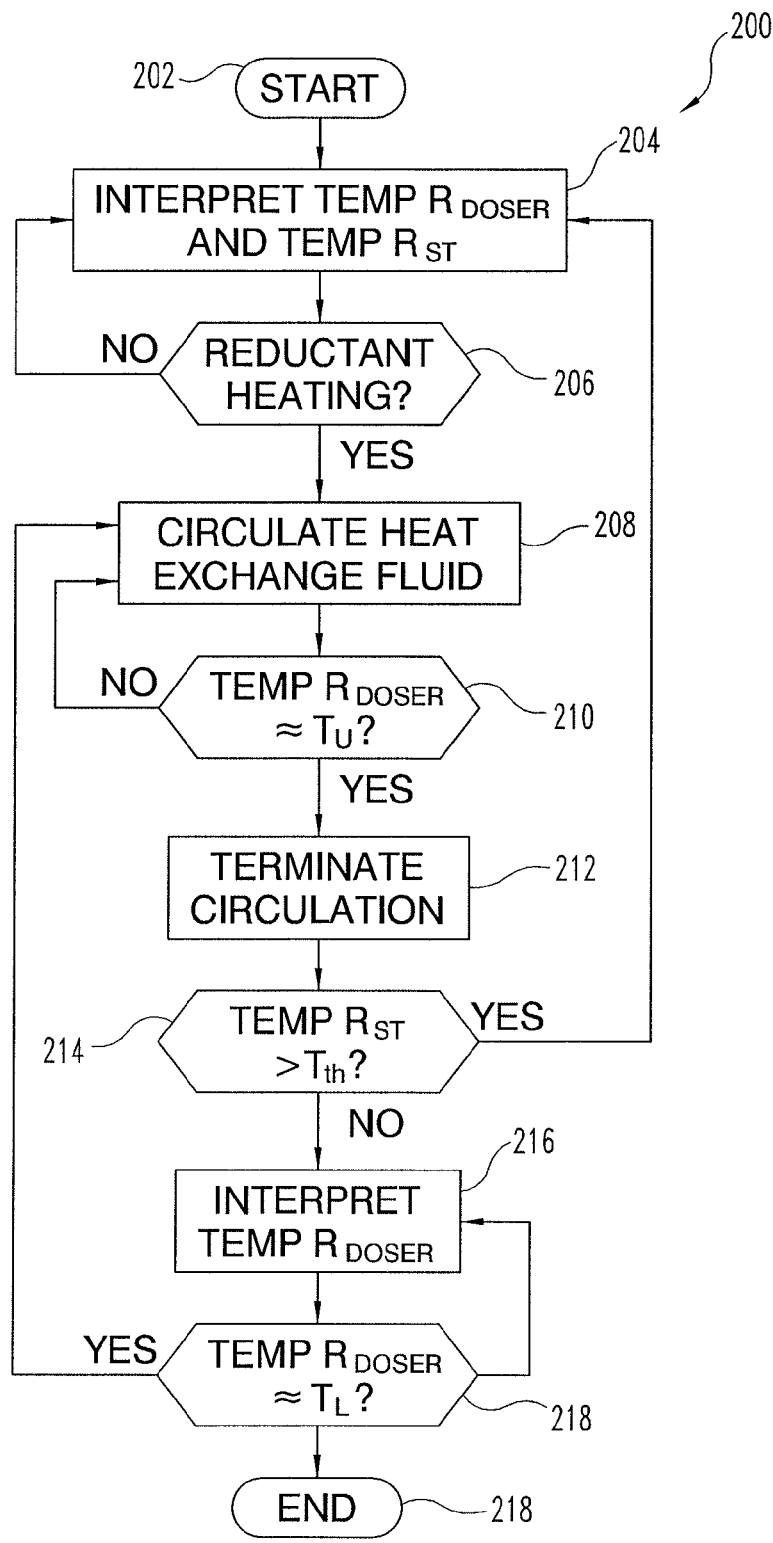
FIG. 3 is a flow diagram of an exemplary reductant heating procedure.

With reference to FIG. 3 there is illustrated a flow diagram of an exemplary heating procedure 200 for reductant delivery system 110 that is put in operation by programming into controller 150 for use in, for example, system 100. Procedure 200 begins at operation 202 in which a control routine for reductant heating of reductant delivery system 110 is started. Operation 202 can begin by interpreting a key-on event and/or by interpretation of an ambient temperature input 162 that is below a predetermined threshold ambient temperature. Operation 202 may alternatively or additionally include interpreting a communication or other parameter indicating that operations of the reductant delivery system 110 is going to resume after a shutdown, or after a period of inactivity of a specified length that may not include a complete shutdown. If an engine system key-on event or other initiation condition is interpreted to be true, procedure 200 proceeds to operation 204. If an engine system key-on event is interpreted to be false, operation 202 repeats.

Operation 204 interprets TEMP $R_{doser}$ input 164, and storage tank TEMP $R_{ST}$ input 166. At conditional 206, procedure 200 determines if inputs 164, 166 indicate that heat exchange fluid is demanded in one or both of doser 114 and storage tank 116 for heating. For example, if TEMP $R_{doser}$ input 164, and storage tank TEMP $R_{ST}$ input 166 of one or both of doser 114 and storage tank 116 is less than a minimum temperature $T_{MIN}$, then reductant heating can be demanded and a heat exchange cycle is initiated. If conditional 206 is negative, procedure 200 returns to operation 204 for continued monitoring of the reductant temperature for a heat exchange fluid demand. Alternatively, procedure 200 can terminate if ambient conditions and reductant temperature conditions indicate that reductant heating will not be required during the particular key-on event.

If conditional 206 is affirmative, procedure 200 continues at operation 208 where control valve 142 is commanded to an open condition to initiate a first circulation period within the first heat exchange cycle by circulating the heat exchange fluid in heat exchange circuit 136. Since heat exchange circuit 136 provides a continuous flow path that extends serially from doser 114 to storage tank 116, reductant solution in doser 114 and storage tank 116 are both heated by circulation of the heat exchange fluid. However, since doser 114 typically contains a smaller volume of reductant than storage tank 116, and first receives the heated heat exchange fluid, the reductant in doser 114 will heat more quickly, and cool more quickly during the termination period, than the reductant in storage tank 116. In another embodiment, the heat exchange circuit 136 is configured to provide a continuous flowpath that extends serially from the heat source to the storage tank 116, through the storage tank 116, from the storage tank 116 to doser 114, and through the doser 114.

During circulation of the heated heat exchange fluid in heat exchange circuit 136, controller 150 continues to monitor TEMP $R_{doser}$ input 164. At conditional 210 it is determined of TEMP $R_{doser}$ input 164 is approximately equal to an upper temperature limit $T_U$. If TEMP $R_{doser}$ input 164 is less than upper temperature limit $T_U$, procedure 200 returns to operation 208 and continues to circulate heat exchange fluid through heat exchange circuit 136. If TEMP $R_{doser}$ input 164 is approximately equal to or greater than upper temperature limit $T_U$, procedure 200 continues at operation 212 where control valve 142 is closed, initiating a termination period of the heat exchange cycle and ending the circulation period of heat exchange fluid in heat exchange circuit 136.

From operation 212 procedure 200 continues at conditional 214 where it is determined if storage tank TEMP $R_{ST}$ input 166 is greater than a threshold temperature $T_{th}$. If conditional 214 is affirmative, procedure 200 returns to operation 202 where the heat exchange cycle is terminated and procedure 200 continues until terminated by a key-off event or other termination condition at operation 220, or by initiating another heat exchange cycle when indicated at conditional 206 as discussed above.

If conditional 214 is negative, procedure 200 continues at operation 216 where controller 150 continues to monitor TEMP $R_{doser}$ input 164 during the termination period of the first heat exchange cycle. At conditional 210 it is determined of TEMP $R_{doser}$ input 164 is approximately equal to or less than a lower temperature limit $T_L$. When TEMP $R_{doser}$ input 164 is greater than lower temperature limit $T_L$, procedure 200 returns to operation 216 and continues to monitor the temperature of the reductant in the doser during the first heat exchange cycle while maintaining the termination period by not circulating heat exchange fluid through heat exchange circuit 136. If TEMP $R_{doser}$ input 164 is approximately equal to or less than lower temperature limit $T_L$, the first heat exchange cycle ends and procedure 200 continues at operation 208 where control valve 142 is commanded open to initiate a second heat exchange cycle with a second circulation period to circulate heat exchange fluid in heat exchange circuit 136. Procedure 200 then continues as discussed above to complete one or more heat exchange cycles of the heat exchange fluid until the temperature of the reductant in the storage tank reaches threshold temperature $T_{th}$.

FIGS. 4A-D illustrate a graphical example of procedure 200 in operation with system 100 over a time period that is depicted along the horizontal axis and, except for FIG. 4D, a temperature that is depicted along the vertical axis of each Figure. FIG. 4D shows the on condition 310 and the off 312 condition of control valve 142 over the time period, while FIG. 4A illustrates a temperature 314 of the heat exchange fluid over the time period. The temperature 314 of the heat exchange fluid is shown as a generally constant temperature, but fluctuations are also possible as the heat exchange fluid is cooled as it passes through doser 114 and storage tank 116 and as it is heated by the heat source.

In FIG. 4B, the TEMP $R_{doser}$ 320 is shown fluctuating between $T_L$ where a circulation period 304 of the heat exchange fluid is initiated by opening control valve 142 and $T_U$ where the circulation period of the heat exchange fluid is terminated by closing control valve 142 to start a termination period 302 in the heat exchange cycle 300. FIG. 4C shows the storage tank TEMP $R_{ST}$ 322 increasing in response to the heat exchange fluid being circulated in circulation period 304 to maintain TEMP $R_{doser}$ 320 between its upper and lower limits $T_U$ and $T_L$. Since the storage tank 116 contains a larger volume of reductant, its cooling rate during the termination period 302 (where control valve 142 is closed) is less than the cooling rate of the reductant in doser 114. When TEMP $R_{doser}$ 320 is approximately $T_L$, the storage tank TEMP $R_{ST}$ 322, while lower than its previous peak when the doser TEMP $R_{doser}$ 320 approximated $T_U$, is greater than it was at the start of the previous heat exchange cycle 300. Therefore, the storage tank TEMP $R_{ST}$ 322 increases from heat exchange cycle 300 to heat exchange cycle 300 despite some cooling during the termination period 302 since the increase in temperature is greater than the decrease in temperature in each cycle 300 while doser TEMP $R_{doser}$ 320 is maintained between upper and lower limits $T_U$ and $T_L$.

In one embodiment, once storage tank TEMP $R_{ST}$ 322 reaches a threshold temperature $T_{th}$, control valve 142 need not be cycled to maintain doser TEMP $R_{doser}$ 322 between $T_U$ and $T_L$. Rather, a minimum low temperature threshold such as $T_{MIN}$ can be provided for TEMP $R_{doser}$ 322 that allows the reductant temperature to drop to a lower temperature than $T_L$ before initiating a new heat exchange cycle 300, to avoid overheating or unnecessary heating of reductant in storage tank 116.

Certain exemplary embodiments will now be further described. Certain exemplary embodiments comprise systems for heating a reductant delivery system that is connected to an exhaust aftertreatment system. Certain exemplary systems include a reductant storage tank configured to store a reductant for treatment of an exhaust gas produced by an internal combustion engine; a doser configured to receive reductant from the storage tank and deliver a quantity of reductant for injection into the exhaust gas; a heat exchange circuit defining a flow path for a heat exchange fluid so that the heat exchange fluid flows through the doser for thermal contact with reductant in the doser, from the doser to the storage tank, through the storage tank for thermal contact with reductant in the storage tank, from the storage tank to the doser, and back through the doser to a return loop for return to the doser; and a control valve in the return loop of the heat exchange circuit operable to regulate a flow of the heat exchange fluid in the flow path.

In some embodiments, the heat exchange circuit further includes a heat source in the return loop to heat the heat exchange fluid before the heat exchange fluid returns to the doser. In one refinement, the heat source is the internal combustion engine and the heat exchange fluid is a coolant that receives heat from operation of the internal combustion engine. In another refinement, the control valve is located in the heat exchange circuit after the storage tank. In other embodiments, the system further comprises a pump to circulate the heat exchange fluid in the heat exchange circuit. In some embodiments, the reductant is a urea solution. In other embodiments, the heat exchange circuit defines a single flow path for the heat exchange fluid. In still other embodiments, the control valve consists of a single two-way control valve in the heat exchange circuit.

In some embodiments, the system also includes an injector connected to the exhaust system and the doser is connected to the injector. In other embodiments, the heat exchange fluid in the portion of the flow path that extends back through the doser to the return loop is in thermal contact with reductant in the doser.

Certain exemplary systems also include an internal combustion engine having an exhaust system for receiving an exhaust gas produced from operation of the internal combustion engine; a reductant delivery system that includes a reductant storage tank and a reductant doser, wherein the storage tank stores a reductant that is provided to the doser for delivery into the exhaust system for treatment of the exhaust gas; and a heat exchange system including a heat exchange circuit configured to provide a flow path for a heat exchange fluid that is heated at least in part by operation of the internal combustion engine. The flow path is arranged to circulate the heat exchange fluid to thermally contact the heat exchange fluid with the reductant in the doser before thermally contacting the heat exchange fluid with the reductant in the storage tank. The heat exchange system further includes a control valve in the flow path to control circulation of the heat exchange fluid.

In certain embodiments, the flow path extends through the doser, from the doser to the storage tank, through the storage tank, from the storage tank to the doser, and back through the doser to a return loop for return to the doser. In other embodiments, the reductant is a urea solution and the system includes an injector connected to the exhaust system and the doser is connected to the injector. In certain refinements of these embodiments, the exhaust system includes a selective catalytic reduction (SCR) catalyst and the injector is connected to the exhaust system upstream of the SCR catalyst.

In other embodiments, the system includes a pump that is operable to circulate the heat exchange fluid through the flow path of the heat exchange circuit. In some embodiments, the heat exchange circuit defines a single flow path for the heat exchange fluid. In other embodiments, the control valve consists of a single two-way control valve in the flow path.

Certain exemplary systems also includes an internal combustion engine for combusting fuel and producing an exhaust stream; an exhaust system connected to the internal combustion engine for receiving the exhaust stream and conveying the exhaust stream to atmosphere, the exhaust system including a selective catalytic reduction (SCR) catalyst configured to convert NOx emissions in the exhaust stream in the presence of a reductant injected into the exhaust system upstream of the SCR catalyst; a storage tank for holding a supply of the reductant; a doser for receiving the reductant from the storage tank and for delivering a quantity of reductant for injection to the exhaust system; and a heat exchange circuit providing a flow path for a heat exchange fluid. The flow path includes a return portion in which the heat exchange fluid is heated at least in part from operation of the internal combustion engine. The flow path further forms a uni-directional flow direction for the heat exchange fluid that extends from the return portion through the doser, from the doser through the storage tank, and from the storage tank through the doser to the return portion. The flow path places the heat exchange fluid that is heated from the internal combustion engine in heat exchange relationship first with reductant in the doser and then with the reductant in the storage tank.

In certain embodiment, the system also includes a control valve in the return portion to regulate flow of the heat exchange fluid in the flow path.

Certain exemplary systems also include an internal combustion engine having an exhaust system for receiving an exhaust gas produced from operation of the internal combustion engine and a reductant delivery system that includes a reductant storage tank and a reductant doser. The storage tank stores a reductant that is provided to the doser for delivery to the exhaust system for treatment of the exhaust gas produced by operation of the internal combustion engine. The systems also include a heat exchange system including a heat exchange circuit configured to provide a flow path for a heat exchange fluid to heat the reductant. The flow path is arranged to circulate the heat exchange fluid to thermally contact heated heat exchange fluid with the reductant in the doser and reductant in the storage tank. The heat exchange system also includes a control valve in the flow path to control a flow of the heat exchange fluid in the supply line. The systems further include a controller connected to the control valve that is operable to open and close the control valve to control circulation of the heat exchange fluid in the flow path. The controller is configured to initiate a first circulation period of the heated heat exchange fluid in the flow path through the doser and then through the storage tank to increase a temperature of the reductant in the doser and the storage tank when the temperature of the reductant in at least one of the doser and the storage tank is less than a predetermined minimum temperature; terminate the first circulation period of the heat exchange fluid when the temperature of the reductant in the doser reaches an upper temperature limit; and initiate a second circulation period of the heat exchange fluid in the heat exchange circuit after the first circulation period when the temperature of the reductant in the doser reaches a lower temperature limit to increase the temperature of the reductant in the doser and the storage tank.

In certain embodiments, the controller is configured to continue the second circulation period of the heat exchange fluid until the temperature of the reductant in the doser reaches the upper temperature limit. The temperature of the reductant in the storage tank is greater at an end of the second circulation period than at an end of the first circulation period. In other embodiments, the controller is configured to determine the temperature of the reductant in the storage tank is less than a threshold temperature before initiating the second circulation period.

Certain exemplary embodiments are methods associated with heating of reductant in a reductant delivery system. Certain exemplary methods include interpreting a temperature of a reductant in a reductant delivery system, the reductant delivery system including a storage tank for storing a source of reductant and a doser for receiving the reductant from the storage tank and providing a measured quantity of the reductant for delivery to an exhaust system of an internal combustion engine; heating a heat exchange fluid with a heat source; when the temperature of the reductant in at least one of the doser and the storage tank is less than a predetermined minimum temperature, initiating a first circulation period of the heated heat exchange fluid through the doser and then through the storage tank to increase a temperature of the reductant in the doser and the storage tank; terminating the first circulation period of the heat exchange fluid when the temperature of the reductant in the doser reaches an upper temperature limit; and after terminating the first circulation period of the heat exchange fluid, initiating a second circulation period of the heat exchange fluid in the heat exchange circuit when the temperature of the reductant in the doser reaches a lower temperature limit to increase the temperature of the reductant in the doser and the storage tank.

In some embodiments, terminating the first circulation period of the heat exchange fluid includes closing a control valve in a flow path of the heat exchange fluid. In other embodiments, the method includes continuing the second circulation period of the heat exchange fluid until the temperature of the reductant in the doser reaches the upper temperature limit. In refinements of this embodiment, the temperature of the reductant in the storage tank is greater at an end of the second circulation period at an end of the first circulation period. In other embodiments, the predetermined minimum temperature is less than the lower temperature limit. In still other embodiments, the heat source is the internal combustion engine, the reductant is a urea solution, and/or the exhaust system includes a selective catalytic reduction catalyst.

In some embodiments, the method includes determining the temperature of the reductant in the storage tank is less than a threshold temperature before initiating a third circulation period after the second circulation period. In other embodiments, the method includes terminating the second circulation period of the heat exchange fluid when the temperature of the reductant in the doser reaches the upper temperature limit; and, after terminating the second circulation period of the heat exchange fluid, initiating a third circulation period of the heat exchange fluid in the heat exchange circuit when the temperature of the reductant in the doser reaches the lower temperature limit to increase the temperature of the reductant in the doser and the storage tank.

In other embodiments, the method includes terminating and initiating a plurality of recirculation periods of the heat exchange fluid in the heat exchange circuit until the temperature of the reductant in the storage tank reaches a predetermined threshold temperature. In refinements of this embodiment, when the temperature of the reductant in the storage tank reaches the predetermined threshold temperature, the method includes initiating another circulation period when the temperature of the reductant in at least one of the doser and the storage tank is less than the predetermined minimum temperature.

Certain exemplary methods further includes heating a reductant in a reductant delivery system that is operable to deliver a reductant for injection into an exhaust system connected to an engine. Heating the reductant includes completing a plurality of heat exchange cycles with a heat exchange fluid flowing in a flow path that extends through the reductant delivery system. At least one of the heat exchange cycles includes increasing a temperature of the reductant in a doser of the reductant delivery system while increasing a temperature of the reductant in a storage tank of the reductant delivery system by circulating the heat exchange fluid from the doser to the storage tank; terminating circulation of the heat exchange fluid when the temperature of the reductant in the doser reaches an upper limit; and ending a current heat exchange cycle when the temperature of the reductant in the doser drops from the upper limit to a lower limit. The temperature of the reductant in the doser drops at a first rate from the upper limit to the lower limit and the temperature of the reductant in the storage tank drops at a second rate that is slower than the first rate.

In some embodiments of the method, the temperature of the reductant in the storage tank is increased from the end of one heat exchange cycle to the next. In other embodiments, completing the plurality of heat exchange cycles includes ending a last one of the heat exchange cycles when the temperature of the reductant in the storage tank reaches a threshold temperature. In still other embodiments, terminating circulation of the heat exchange fluid includes closing a control valve in the flow path. In some embodiments, the method includes heating the heat exchange fluid in the flow path. In other embodiments, the flow path extends serially from a heat source to the doser, through the doser, from the doser to the storage tank, and through the storage tank.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method, comprising:
   interpreting a temperature of a reductant in a reductant delivery system, the reductant delivery system including a storage tank for storing a source of reductant, a doser for receiving the reductant from the storage tank and providing a measured quantity of the reductant for delivery to an exhaust system of an internal combustion engine, and an injector for inserting the reductant received from the doser into the exhaust system;
   heating a heat exchange fluid in a heat exchange circuit with a heat source, the heat exchange circuit including a conduit providing a single continuous uni-directional flow path that extends serially from a heat source to the storage tank, through the storage tank, from the storage tank to the doser, through the doser and back to the heat source in a closed loop, the heat exchange circuit fluidly isolated from the injector;
   when the temperature of the reductant in at least one of the doser and the storage tank is less than a predetermined minimum temperature, initiating a first circulation period of the heated heat exchange fluid in the heat exchange circuit by selectively opening a control valve positioned in the flow path of the heat exchange fluid, the heat exchange fluid flowing through the doser and then through the storage tank to increase a temperature of the reductant in the doser and the storage tank;
   terminating the first circulation period of the heat exchange fluid by selectively closing the control valve when the temperature of the reductant in the doser reaches an upper temperature limit; and
   after terminating the first circulation period of the heat exchange fluid, initiating a second circulation period of the heat exchange fluid in the heat exchange circuit when the temperature of the reductant in the doser reaches a lower temperature limit to increase the temperature of the reductant in the doser and the storage tank.

2. The method of claim 1, further comprising continuing the second circulation period of the heat exchange fluid in the heat exchange circuit until the temperature of the reductant in the doser reaches the upper temperature limit.

3. The method of claim 2, wherein the temperature of the reductant in the storage tank is greater at an end of the second circulation period than at an end of the first circulation period.

4. The method of claim 1, wherein the predetermined minimum temperature is less than the lower temperature limit.

5. The method of claim 1, wherein the heat source is the internal combustion engine.

6. The method of claim 1, wherein the reductant is a urea solution and the exhaust system includes a selective catalytic reduction catalyst.

7. The method of claim 1, further comprising determining the temperature of the reductant in the storage tank is less than a threshold temperature before initiating a third circulation period after the second circulation period.

8. The method of claim 1, further comprising:
terminating the second circulation period of the heat exchange fluid when the temperature of the reductant in the doser reaches the upper temperature limit; and
after terminating the second circulation period of the heat exchange fluid, initiating a third circulation period of the heat exchange fluid in the heat exchange circuit when the temperature of the reductant in the doser reaches the lower temperature limit to increase the temperature of the reductant in the doser and the storage tank.

9. The method of claim 1, further comprising:
terminating and initiating a plurality of recirculation periods of the heat exchange fluid in the heat exchange circuit until the temperature of the reductant in the storage tank reaches a predetermined threshold temperature.

10. The method of claim 9, wherein when the temperature of the reductant in the storage tank reaches the predetermined threshold temperature, initiating another circulation period when the temperature of the reductant in at least one of the doser and the storage tank is less than the predetermined minimum temperature.

11. The method of claim 1, wherein the control valve includes a two-way control valve.

12. A method, comprising:
heating a reductant in a reductant delivery system that is operable to deliver a reductant for injection into an exhaust system connected to an engine, wherein heating the reductant includes completing a plurality of heat exchange cycles with a heat exchange fluid in a heat exchange circuit, the heat exchange circuit including a conduit providing a single continuous uni-directional flow path that extends serially from a heat source to a storage tank, through the storage tank, from the storage tank to a doser, through the doser and back to the heat source in a closed loop, the heat exchange circuit fluidly isolated from an injector, wherein at least one of the heat exchange cycles includes:
increasing a temperature of the reductant in the doser of the reductant delivery system while increasing a temperature of the reductant in a storage tank of the reductant delivery system by circulating the heat exchange fluid in the heat exchange circuit from the doser to the storage tank via selectively opening a control valve positioned in a flow path of the heat exchange fluid;
terminating circulation of the heat exchange fluid when the temperature of the reductant in the doser reaches an upper limit by selectively closing the control valve; and
ending a current heat exchange cycle when the temperature of the reductant in the doser drops from the upper limit to a lower limit, wherein the temperature of the reductant in the doser drops at a first rate from the upper limit to the lower limit and the temperature of the reductant in the storage tank drops at a second rate that is slower than the first rate.

13. The method of claim 12, wherein the temperature of the reductant in the storage tank increases from the end of one heat exchange cycle to the next.

14. The method of claim 12, wherein completing the plurality of heat exchange cycles includes ending a last one of the heat exchange cycles when the temperature of the reductant in the storage tank reaches a threshold temperature.

15. The method of claim 12, further comprising heating the heat exchange fluid in the flow path.

16. The method of claim 12, wherein the control valve includes a two-way control valve.

* * * * *